United States Patent [19]
Patmore et al.

[11] 3,824,324
[45] July 16, 1974

[54] LOCALIZER SIMULATOR APPARATUS

[75] Inventors: James R. Patmore, Neptune; Joseph E. Sidoti, Red Bank, both of N.J.

[73] Assignee: Electronic Associates, Inc., Long Branch, N.J.

[22] Filed: Apr. 25, 1973

[21] Appl. No.: 354,370

[52] U.S. Cl. ............ 35/10.2, 235/150.22, 235/183, 235/184, 328/127
[51] Int. Cl. ............................................. G09b 9/08
[58] Field of Search ........ 35/10.2; 235/150.22, 183, 235/184; 328/127

[56] References Cited
UNITED STATES PATENTS

| | | | |
|---|---|---|---|
| 3,205,707 | 9/1965 | Richter | 235/150.22 X |
| 3,500,028 | 3/1970 | Killian | 235/183 |
| 3,679,880 | 7/1972 | Carver | 35/10.2 X |

OTHER PUBLICATIONS

Korn, G. A. et al., Electronic Analog Computers, N.Y., McGraw-Hill, 1956, p. 13, 20.

*Primary Examiner*—Charles E. Atkinson
*Assistant Examiner*—R. Stephen Dildine, Jr.

[57] ABSTRACT

Localizer simulator apparatus for simulating a localizer approach of an aircraft to a runway at an airport, said runway having a predetermined heading and a localizer beam being provided along said runway, comprising a first voltage divider network for providing a first predetermined voltage indicative of a predetermined runway heading; a second voltage divider network for providing a variable second predetermined voltage indicative of a compass heading simulating the actual heading of the aircraft, the second voltage divider network being operable to simulate a change in the compass heading whereby the second predetermined voltage is varied to indicate the change in compass heading; a current summing network for receiving the first and the second predetermined voltages and for developing respective currents therefrom and for summing the developed currents to provide a summed current signal which is indicative of any difference between the first and second predetermined voltage; analog integrator means having an input for receiving the summed current signal and for providing a voltage output signal which is proportional to the integral of the summed current and which is indicative of any difference between the first and second predetermined voltage and which is also indicative of the amount of time there is any difference between the first and the second predetermined voltages; course deviation indicator means for receiving the voltage output signal and for providing a visual display which is indicative of any difference between the predetermined runway heading and the simulated compass heading and which also is indicative of the amount of time there was any difference between the first and the second predetermined voltages.

6 Claims, 1 Drawing Figure

LOCALIZER SIMULATOR APPARATUS

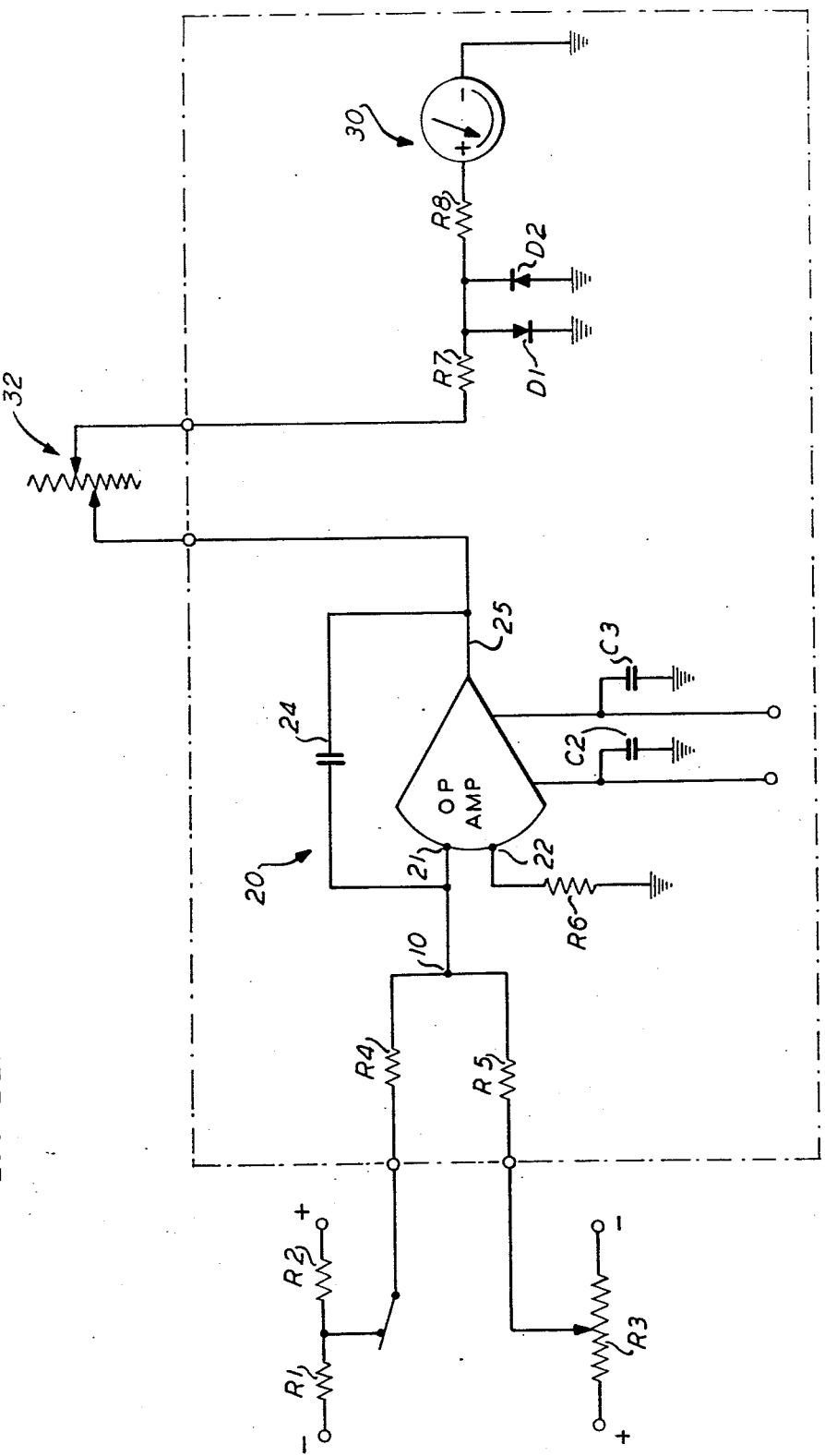

LOCALIZER SIMULATOR APPARATUS

BACKGROUND OF THE INVENTION

As is known to those skilled in the art, most airports and aircraft are provided with instrumentation referred to as Instrument Landing System (ILS) which assists the pilot of an aircraft in making approaches to landing under conditions of very low ceiling and visibility. Such ILS consists of various components, including a localizer radio beam for furnishing horizontal guidance to the airport runway, and two VHF marker signals which provide accurate radio fixes along the approach path to the runway.

With particular regard to the localizer beam, a localizer antenna array is typically located on the extended center line of the runway of the airport, remote enough from the opposite end approach of the runway to prevent the array from becoming a collision hazard. The array radiates a field pattern or develops a beam or course down the center line of the runway toward the middle and outer markers. As is further known to those skilled in the art, the radiated field pattern or beam is modulated at two different frequencies. The right side of the beam, viewed along the front approach to the runway, is modulated at 150 Hz, and, the left side of the radiated beam is modulated at 90 Hz. The center or on-course path, is formed by equisignal points between the two modulated sides of the beam and becomes increasingly narrow as the transmitted array is approached.

With particular regard to the marker signals, as noted above, two marker signals are typically used in an ILS system. The marker signals are provided by low-powered transmitters typically operating on a frequency of 75 MHz, and the radiation patterns of such signals are generally fan-shaped with an elliptical cross-section with its minor axis parallel to the approach path to the runway and with its major axis at right angles to the approach path. The two marker signals are typically referred to as the outer marker signal and the middle marker signal. Typically, the outer marker signal is received by an aircraft at a point within 4 to 7 miles from the airport runway, and the middle marker signal is received by the air craft, typically, at approximately 3,500 feet from the approach end of the runway.

As is further known to those skilled in the art, various prior art flight simulator apparatus are available for simulating a localizer approach of an aircraft to an airport runway. Such prior art apparatus are typically mechanical and/or electromechanical and have not proven to be altogether satisfactory in simulating a localizer approach to an airport, and have also been typically unwantedly expensive and cumbersome and not desirably sensitive as to the simulation of an actual localizer approach to an airport runway.

Further in the typical prior art flight simulator for simulating a localizer beam landing approach, only the simulated fact of flying divergent course or heading relative to the center of the localizer beam is simulated and no simulation is provided for indicating or simulating the amount of time the divergent course or heading was flown, and hence, nothing is provided for simulating the amount of time a correction course or heading must be flown to again intercept the center of the localizer beam.

Accordingly, to more realistically simulate actual localizer beam landing approach conditions, there exists a need for localizer simulator apparatus which simulates not only the direction of a correction course to be flown to intercept the center of the localizer beam, but which also simulates the amount of time the correction heading must be flown to intercept the center of the localizer beam.

SUMMARY

The present invention overcomes the above-noted prior art deficiencies by providing apparatus which is easy to operate, relatively inexpensive, and which uniquely simulates a localizer approach of an aircraft to the runway of an airport, and which apparatus has increased sensitivity for so simulating such a localizer approach. More particularly, the present invention simulates not only the corrections in heading or direction that must be made to correct for a divergent course from the center of the localizer beam that has been flown, but also simulates the amount of time that a correction course must be flown to intercept the center of the localizer beam.

DESCRIPTION OF THE DRAWING

The drawing illustrates an embodiment of the localizer simulator apparatus according to the present invention.

DESCRIPTION OF THE INVENTION

Referring now to the drawing, there is shown apparatus embodying the localizer simulator apparatus of the present invention.

Resistors R1 and R2 provide a first voltage divider network for presenting a first predetermined voltage indicative of a predetermined runway heading, for example, should the runway heading of the airport to be simulated be a heading of 320°, the voltage provided at the output of the first voltage divider network could be, for example, a voltage of +5 volts. The first voltage divider network may be set, for example, manually by the trainee operating the localizer simulator apparatus by manually setting the navigation frequency switch which is set in accordance with a predetermined frequency which in turn provides the predetermined voltage indicative of the compass heading of the runway at which an aircraft is to land.

Resistor R3 provides a second voltage divider network for presenting a variable second predetermined voltage indicative of an actual compass heading, that is, the simulated acutal compass heading the aircraft is flying. This voltage divider network is operated by the compass which indicates the simulated actual heading of the aircraft, and is operable in response to a simulated change is heading produced by the operator of the simulator apparatus in causing a change in heading, to vary the second predetermined voltage to indicate a change in compass heading.

It will be understood that upon the aircraft flying an actual heading which is also the heading of the runway at which the aircraft is to land, and which heading or bearing has been set by the above-mentioned navigational frequency switch, the voltages provided by the first and second voltage divider networks will be of equal magnitude but of opposite sign.

Further, the localizer simulator apparatus includes a current summing network including resistors R4 and R5 which current summing network receives the output voltages of the first and second voltage divider networks and develops respective currents therefrom provides a summed current signal at its output 10, which summed current signal is indicative of any difference between the first and second predetermined voltages provided by the first and second voltage divider networks.

Further included are analog integrator means indicated by general numerical designation 20. Such analog integrator means includes a suitable operational amplifier, as shown, provided with an inverting input 21 and a non-inverting input 22, a capcitive feedback network 24 and an output 25. The non-inverting input of the operational amplifier is connected to ground by a suitable resistor R6 which, as known to those skilled in the art, determines the operating point of the operational amplifier. The inverting input 21 of the operational amplifier is connected to the output of the current summing network and receives the above-mentioned summed current output signal provided by the current summing network. Upon the summed current output signal from the current summing network being received at the inverting input of the operational amplifier, the analog integrator means 20 provides an output voltage at the output of the operational amplifier 25 which is a voltage proportional to the integral of the summed current provided at the inverting input 21, and which output voltage signal is indicative of any difference between the first and second predetermined voltages (i.e. is indicative of the aircraft flying a simulated divergent course heading away from the runway heading) and which is also indicative of the amount of time there is any difference between the first and second predetermined voltages (i.e. is indicative of the amount of time the aircraft flew a simulated divergent course or heading away from he runway heading), and hence, the output voltage signal is indicative of the simulated position of the aircraft relative to the runway heading or center of the localizer beam.

Further provided in the localizer simulator apparatus of the present invention are course deviation indicator means 30 for providing a visual display indicative of the simulated positions of the aircraft with respect to the center of the localizer beam. For example, should the needle of the course deviation indicator be displaced to the left of its center position, such leftward displacement would provide a visual display indicative of the aircraft approaching the runway to the left of the center of the localizer beam, conversely, should the course deviation indicator means needle be displaced rightwardly of its center position, such rightward displacement would provide a visible display indicative of the aircraft approaching the runway to the right of the center of the localizer beam; such needle deviation being produced in simulated response to the above-noted signal modulations provided on the right and left of the center of the localizer beam. However, should the needle of the course deviation indicator means 30 be in its center position, such center position would simulate that the aircraft is approaching the runway along the center of the localizer beam.

The localizer simulator apparatus of the present invention, as noted above, may include additional means, responsive to the simulated receipt of outer and middle marker signals, for increasing the sensitivity of the course deviation indicator means 30 to provide simulated increased sensitivity of such course deviation indicator means so as to provide an increased sensitivity to the course deviation indicator means in simulating the increased or increasing proximity of the aircraft to the runway. Such additional means may be the motor driven variable resistor 32. As shown in the drawing, such motor driven variable resistor means 32 is interconnected between the analog integrator means 20 and the course deviation indicator means 30.

Still referring to the drawing, resistors R7 and R8 and diodes D1 and D2 may be provided to current limit the course deviation indicator means 30 and preclude large and possibly damaging currents from reaching the course deviation indicator means and causing damage thereto.

Referring again to the above-noted output signal of the analog integrator means 20, such signal as noted above, is indicative of any difference between the first and second predetermined voltages (i.e. is indicative of the aircraft flying a simulated divergent course heading away from the runway heading) and is also indicative of the amount of time there is any difference between the first and second predetermined voltages (i.e. is indicative of the amount of time the aircraft flew a simulated divergent course or heading away from the runway heading). Thus, if the aircraft has flown a simulated divergent heading from the center of the localizer beam for a period of time, such heading error is accumulated by the analog integrator means 20 and even if the aircraft compass heading has been changed in simulating the flying of an intercept path to cause the aircraft to again intercept the center of the localizer beam such that the simulated compass heading of the aircraft is a heading parallel to the heading of the runway, if the amount of time spent flying the return or intercept heading is not equal to the time spent flying the divergent heading, the needle of the course deviation indicator means 30 will not be in its center position even though the output voltages of the first and second resistor networks are of equal magnitude and opposite sign due to the runway heading and compass heading being the same. The accumulated difference between such voltages, i.e. the amount of time such voltages were different, will be indicated in the output signal of the analog integrator means 20 so as to displace the course deviation indicator needle to indicate that the aircraft's position is still to the right or left of the center of the localizer beam due to the fact that the amount of time spent flying the divergent heading was greater than the amount of time spent flying the return or intercept heading. Accordingly, increased realism is provided so as to more faithfully simulate the actual conditions experienced by a pilot in actually landing and aircraft at a runway utilizing the localizer beam of an ILS system.

Referring again to the drawing, capacitors C2 and C3 may be provided to preclude unwanted oscillation by the operational amplifier.

It will be understood by those skilled in the art that many modifications may be made in the present invention without departing from the spirit and scope thereof.

What is claimed is:

1. Localizer simulator apparatus for simulating a localizer approach of an aircraft to a runway at an airport, said runway having a predetermined heading and a localizer beam being provided along said runway, comprising:

a first voltage divider network for providing a first predetermined voltage indicative of a predetermined runway heading;

a second voltage divider network for providing a variable second predetermined voltage indicative of a compass heading simulating the actual heading of the aircraft, said second voltage divider network being operable to simulate a change in said compass heading whereby said second predetermined voltage is varied to indicate said change in compass heading;

a current summing network for receiving said first and said second predetermined voltages and for developing respective currents therefrom and for summing said developed currents to provide a summed current signal which is indicative of any difference between said first and second predetermined voltage;

analog integrator means having an input for receiving said summed current signal and for providing a voltage output signal which is proportional to the integral of said summed current and which is indicative of any difference between said first and said second predetermined voltage and which is also indicative of the amount of time there is any difference between said first and said second predetermined voltages;

course deviation indicator means for receiving said voltage output signal and for providing a visual display which is indicative of any difference between said predetermined runway heading and said simulated compass heading and which also is indicative of the amount of time there was any difference between said first and said second predetermined voltages, and means connected between said analog integrator means and said course deviation indicator means for continuously varying the voltage output signal of said analog integrator means as a function of increasing or decreasing proximity of the aircraft to the runway.

2. Localizer simulator apparatus for simulating a localizer approach of an aircraft to a runway at an airport, said runway having a predetermined heading and a localizer beam being provided along said runway, comprising:

a first voltage divider network for providing a first predetermined voltage indicative of a predetermined runway heading;

a second voltage divider network for providing a variable second predetemined voltage indicative of a compass heading simulating the actual heading of the aircraft, said second voltage divider network being operable to simulate a change in said compass heading whereby said second predetermined voltage is varied to indicated said change in compass heading;

a current summing network for receiving said first and said second predetermined voltages and for developing respective currents therefrom and for summing said developed currents to provide a summed current signal which is indicative of any difference between said first and second predetermined voltage;

analog integrator means including an operational amplifier having an inverting input, a non-inverting input, a capacitive feedback network and an output, said inverting input for receiving said summed current signal and for providing a voltage output signal at said output which is proportional to the integral of said summed current and which is indicative of any difference between said first and said second predetermined voltage and which is also indicative of the amount of time there is any difference between said first and said second predetermined voltage;

course deviation indicator means for receiving said voltage output signal and for providing a visual display which is indicative of any difference between said predetermined runway heading and said simulated compass heading and which also is indicative of the amount of time there was any difference between said first and said second predetermined voltages, and variable means connected between said analog integrator means and said course deviation indicator means for continuously modifying the voltage output signal of said analog integrator means as a function of simulated proximty of the aircraft to the runway.

3. Localizer simulator apparatus for simulating a localizer approach of an aircraft to a runway at an airport, said runway having a predetermined heading and a localizer beam being provided along said runway, comprising:

a first voltage divider network for providing a first predetermined voltage indicative of a predetermined runway heading;

a second voltage divider network for providing a variable second predetermined voltage indicative of a compass heading simulating the actual heading of the aircraft, said second voltage divider network being operable to simulate a change in said compass heading whereby said second predetermined voltage is varied to indicate said change in compass heading;

a current summing network for receiving said first and said second predetermined voltages and for developing respective currents therefrom and for summing said developed currents to provide a summed current signal which is indicative of any difference between said first and second predetermined voltage;

analog integrator means including an operational amplifier having an inverting input, a non-inverting input, a capacitive feedback network and an output, said inverting input for receiving said summed current signal and for providing a voltage output signal at said output which is proportional to the integral of said summed current and which is indicative of any difference between said first and said second predetermined voltage and which is also indicative of the amount of time there is any difference between said first and said second predetermined voltages;

course deviation indicator means for receiving said voltage output signal and for providing a visual display which is indicative of any difference between said predetermined runway heading and said simulated compass heading and which also is indicative of the amount of time there was any difference between said first and said second predetermined voltages; and means, responsive to simulated marker signals, interconnected between said analog integrator means and said course deviation indicator means and for continuously increasing the sensitivity of said course deviation indicator means to simulate the increasing proximity of the aircraft to said runway.

4. Apparatus according to claim 3 wherein said means for increasing the sensitivity of said course deviation indicator means includes a motor driven variable resistor.

5. Apparatus according to claim 3 further including protection means connected intermediate said course deviation indicator means and said analog integrator means for protecting said course deviation indicator means from overload currents.

6. Apparatus according to claim 5 wherein said protection means comprises a current limiting resistor-diode network including a pair of series connected resistors and a pair of parallel connected diodes.

* * * * *